(12) United States Patent
Hudson et al.

(10) Patent No.: US 11,055,689 B2
(45) Date of Patent: *Jul. 6, 2021

(54) METHOD AND SYSTEM FOR GEOFENCING

(71) Applicant: MASTERCARD INTERNATIONAL INCORPORATED, Purchase, NY (US)

(72) Inventors: Scott Hudson, Pearl River, NY (US); Kent Olof Niklas Berntsson, New York, NY (US); Stephen Andrew Gerhard, San Francisco, CA (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/514,209

(22) Filed: Jul. 17, 2019

(65) Prior Publication Data

US 2019/0340600 A1 Nov. 7, 2019

Related U.S. Application Data

(63) Continuation of application No. 15/185,560, filed on Jun. 17, 2016, now Pat. No. 10,402,812.

(51) Int. Cl.
*G06Q 20/32* (2012.01)
*G06Q 20/14* (2012.01)
(Continued)

(52) U.S. Cl.
CPC ......... *G06Q 20/3224* (2013.01); *G06Q 20/14* (2013.01); *G06Q 20/405* (2013.01); *H04L 63/107* (2013.01); *H04W 4/021* (2013.01)

(58) Field of Classification Search
CPC ........ G06Q 20/32; G06Q 20/14; G06Q 20/40; H04L 63/10; H04W 4/02
(Continued)

(56) References Cited

U.S. PATENT DOCUMENTS 5,819,234 A * 10/1998 Slavin .................. G07B 15/063
340/10.4
9,020,848 B1 * 4/2015 Ridge ...................... G07C 1/10
705/32

(Continued)

FOREIGN PATENT DOCUMENTS

EP 2930681 A1 10/2015

OTHER PUBLICATIONS

Office Action (Communication pursuant to Article 94(3) EPC) dated Apr. 17, 2020, by the European Patent Office in corresponding European Patent Application No. 17 726 530.3-1213. (8 pages).

(Continued)

*Primary Examiner* — Robert R Niquette
(74) *Attorney, Agent, or Firm* — Buchanan Ingersoll & Rooney PC

(57) ABSTRACT

A method for initiating a time- and geographic-based electronic transaction includes: storing, in a mobile computing device, payment details associated with a transaction account; receiving a payment zone notification upon entry of the mobile computing device into a predefined geographic area, the notification including payment terms; registering a first timestamp upon receipt of the notification; displaying the payment terms; receiving an indication of approval of the payment terms; receiving an exit notification upon exit of the mobile computing device from the predefined geographic area; registering a second timestamp upon receipt of the exit notification; calculating a transaction amount based on an elapsed amount of time between the first timestamp and the second timestamp and a payment rate; and transmitting the calculated transaction amount and payment details.

8 Claims, 8 Drawing Sheets

(51) Int. Cl.
  *G06Q 20/40* (2012.01)
  *H04W 4/00* (2018.01)
  *H04L 29/06* (2006.01)
  *H04W 4/021* (2018.01)

(58) Field of Classification Search
  USPC .................................................. 705/35–45
  See application file for complete search history.

(56) References Cited

U.S. PATENT DOCUMENTS

| | | | |
|---|---|---|---|
| 9,311,685 B2 | 4/2016 | Harkey et al. | |
| 9,351,114 B2 | 5/2016 | Chatterjee et al. | |
| 2008/0208681 A1 | 8/2008 | Hammad et al. | |
| 2010/0268618 A1* | 10/2010 | McQuilken | G06Q 20/40 |
| | | | 705/26.1 |
| 2011/0060600 A1* | 3/2011 | Fox | G01S 19/51 |
| | | | 705/1.1 |
| 2011/0136468 A1* | 6/2011 | McNamara | G06Q 20/16 |
| | | | 455/406 |
| 2012/0265585 A1* | 10/2012 | Muirbrook | G06Q 20/3276 |
| | | | 705/13 |
| 2013/0030964 A1 | 1/2013 | Nuzzi et al. | |
| 2014/0180710 A1 | 6/2014 | Mitchley | |
| 2014/0201066 A1 | 7/2014 | Roux et al. | |
| 2014/0379442 A1 | 12/2014 | Dutta et al. | |
| 2015/0051953 A1 | 2/2015 | Howe | |
| 2015/0134428 A1 | 5/2015 | Li et al. | |
| 2015/0294298 A1* | 10/2015 | Michishita | G06Q 20/308 |
| | | | 705/13 |
| 2016/0171785 A1 | 6/2016 | Banatwala et al. | |
| 2016/0241997 A1* | 8/2016 | Lucas | G06Q 20/12 |
| 2017/0178117 A1* | 6/2017 | McClard | H04W 4/021 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated Aug. 1, 2017, by the European Patent Office in corresponding International Application No. PCT/US2017/034117. (15 pages).

Office Action (First Examination Report) dated Dec. 24, 2020, by the Patent Office, Government of India, in corresponding India Patent Application No. 201817042639 with an English Translation of the Office Action. (8 pages).

\* cited by examiner

METHOD AND SYSTEM FOR GEOFENCING

FIELD

The present disclosure relates to the use of geofencing in conjunction with a transaction, specifically the use of geofences to demarcate payment zones and use thereof in initiating time- and geographic-based electronic transactions.

BACKGROUND

Consumers engage in electronic payment transactions for a wide variety of goods and services. One such product that may be purchased by consumers is access to a geographic location. For instance, music festivals, museums, concerts, sporting events, and other similar events and/or venues often will charge a consumer for entry. In some cases, a consumer may be charged not for access to an indicated geographic location itself, but rather for access to a good or service inside of that geographic location. For example, an amusement park may charge the consumer upon entry into the park, and perhaps additionally for the ability to ride the rides inside of the park. The same may be true of accessing national parks and the like. In many instances, consumers are charged a one-time fee to be paid prior to entry.

However, in many instances it may be more profitable for a merchant to charge a consumer based on a length of time to which the consumer is provided access to a location or a service located therein. For many consumers, it may also be more cost-effective to only pay for as long as they are in the geographic location or are using the purchased service. As a result, it may be beneficial for both merchants and consumers to pay for access based not only on location, but also on time.

However, it may be exceedingly difficult for a merchant to keep track of the time duration when a consumer is inside of a geolocation, particularly in instances where there may be hundreds or thousands of consumers coming and going at any given time, such as with an amusement park, music festival, museum, etc. In such instances, the merchant must be able to individually identify each consumer as they both enter and exit the geographic location, must determine the cost of the access when the consumer exits, and must receive payment details from the consumer at some point during the process to be able to initiate the corresponding payment transaction. Such a system is often utilized for parking structures, where a consumer is charged based on a length of time that their vehicle is parked inside the structure or area. Similarly, mass transit systems track ridership, not generally by time but by length of travel between stops.

Unfortunately, such systems are often unsuitable for locations and services where a large number of consumers may enter and/or exit at the same time, such as for an amusement park or concert, particularly when the boundary is porous to human traffic. In addition, such systems often require several computing systems and associated infrastructure, which may be expensive for a merchant and also difficult to install in existing areas. Furthermore, such systems may also be inefficient in instances where multiple payment zones may be desired, such as where separate fees may be charged for different areas of an amusement park or museum, or where a smaller payment zone may be placed within a larger payment zone, such as a VIP area at a concert. Conventional systems often require a great deal of hardware in computing systems, gates, readers of one kind or another at gates, distribution systems for tickets or the like, etc.

Thus, there is a need for a technical solution where a consumer can be efficiently charged for access to one or more payment zones based on a length of time inside the payment zone that is suitable for use in instances where a significant number of consumers may be entering or exiting the payment zone.

SUMMARY

The present disclosure provides a description of systems and methods for initiating a time- and geographic-based electronic transaction.

A method for initiating a time- and geographic-based electronic transaction includes: storing, in a memory of a mobile computing device, payment details, wherein the payment details comprises a structured data set including data associated with a transaction account suitable for use in funding an electronic transaction; receiving, by a receiving device of the mobile computing device, a first data signal superimposed with a payment zone notification, wherein the first data signal is received upon entry of the mobile computing device into a predefined geographic area and where the payment zone notification includes at least payment terms; registering, by a timing module of the mobile computing device, a first timestamp upon receipt of the first data signal; displaying, on a display device of the mobile computing device, at least the payment terms included in the payment zone notification; receiving, by an input device of the mobile computing device, an indication of approval of the payment terms; receiving, by the receiving device of the mobile computing device, a second data signal superimposed with an exit notification, wherein the second data signal is received upon exit of the mobile computing device from the predefined geographic area; registering, by the timing module of the mobile computing device, a second timestamp upon receipt of the second data signal; calculating, by a calculation module of the mobile computing device, a transaction amount based on at least an elapsed amount of time between the first timestamp and the second timestamp and a payment rate; and electronically transmitting, by a transmitting device of the mobile computing device, a third data signal superimposed with at least the calculated transaction amount and payment details.

A system for initiating a time- and geographic-based electronic transaction includes: a transmitting device of a mobile computing device; a calculation module of the mobile computing device; a memory of the mobile computing device configured to store payment details, wherein the payment details comprises a structured data set including data associated with a transaction account suitable for use in funding an electronic transaction; a receiving device of the mobile computing device configured to receive a first data signal superimposed with a payment zone notification, wherein the first data signal is received upon entry of the mobile computing device into a predefined geographic area and where the payment zone notification includes at least payment terms; a timing module of the mobile computing device configured to register a first timestamp upon receipt of the first data signal; a display device of the mobile computing device configured to display at least the payment terms included in the payment zone notification; and an input device of the mobile computing device configured to receive an indication of approval of the payment terms. The receiving device of the mobile computing device is further configured to receive a second data signal superimposed with an exit notification, wherein the second data signal is received upon exit of the mobile computing device from the predefined geographic area. The timing module of the mobile computing device is further configured to register a second timestamp upon receipt of the second data signal. The calculation module of the mobile computing device is configured to calculate a transaction amount based on at least an elapsed amount of time between the first timestamp and the second timestamp and a payment rate. The transmitting device of the mobile computing device is configured to electronically transmit a third data signal superimposed with at least the calculated transaction amount and payment details.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
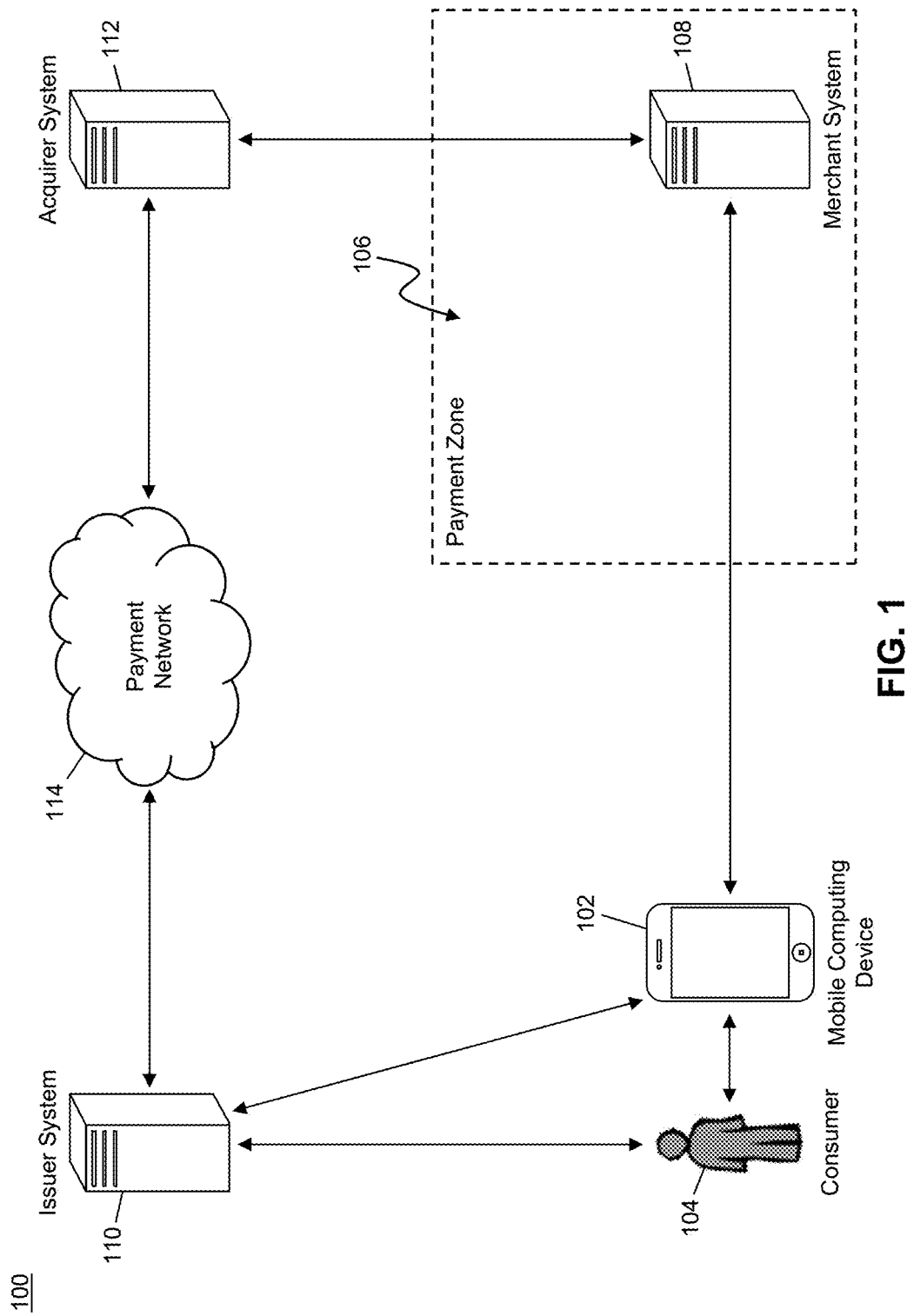
FIG. 1 is a block diagram illustrating a high level system architecture for processing time- and location-based transactions associated with geofenced payment zones in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

System for Time- and Location-Based Transactions Using Geofences

FIG. 1 illustrates a system 100 for the initiation and processing of electronic payment transactions that are based on time accessing a geofenced payment zone by a consumer.

The system 100 may include a mobile computing device 102. The mobile computing device 102, discussed in more detail below, may be configured to measure a length of time during which an associated consumer 104 accesses a payment zone 106 and to initiate a payment transaction for access to the payment zone 106 based on the measured length of time. The mobile computing device 102 may be any type of mobile device suitable for performing the functions discussed herein, such as a cellular phone, smart phone, tablet computer, laptop computer, smart watch, wearable computing device, implantable computing device, etc. The payment transaction may be funded via a transaction account issued to the associated consumer 104 by an issuing financial institution, such as an issuing bank. As part of the issuing of the transaction account to the consumer 104, an issuer system 110 of the issuing financial institution may issue payment details for the transaction account to the mobile computing device 102. Methods suitable for the provisioning of payment details to a mobile computing device 102 will be apparent to persons having skill in the relevant art. The payment details may include at least a primary account number and any other data suitable for use in conducting a payment transaction funded via the associated transaction account, such as a transaction counter, one or more cryptograms, etc.

The consumer 104 may take the mobile computing device 102 into a payment zone 106 associated with a merchant system 108. The payment zone 106 may be a geofenced area, which may be an area defined by a geographic location. In some instances, the geofenced area may be associated with a visible physical area, such as a building or a fenced area, or the range of a wireless signal, such as various types of cellular, WiFi, BlueTooth, or other type of signal protocols, or mixtures thereof, that have a defined range at a predetermined signal strength wherein the outer boundary of the range can be made to match a desired geographic, virtual fence or area by controlling transmission power, selectively placing antennas, using repeaters and/or multiple frequencies or multiplexing schemes, and the like. In some embodiments, the payment zone 106 may be manually defined, such as by a user of the merchant system 108 that may input geographic coordinates into the computing device 102 (e.g., defined by latitude and longitude), drawing a geographic representation on an electronic map as is known, or other suitable representations for the payment zone 106. Passing into a defined payment zone might be self-reported by detecting a broadcast or point-to-point transmission, or use of the geolocation detecting mechanism, of a user's mobile device, for example, as explained below. In other embodiments, the payment zone 106 may be generated via one or more suitable methods, such as those described in: U.S. patent application Ser. No. 13/969,839, entitled "Method and System for Geolocation Mapping of Indoor Locations Using Payment Data," by Justin X. Howe, filed Aug. 19, 2013; U.S. patent application Ser. No. 14/040,328, entitled "Generating Geofences," by Shuvo Cahtterjee et al., filed Sep. 27, 2013; and U.S. patent application Ser. No. 13/826,671, entitled "Geolocation Check-In System," by Scott Lee Harkey et al., filed Mar. 14, 2013, each of which are herein incorporated by reference in their entirety.

Upon entry into the payment zone 106, the merchant system 108 may detect the mobile computing device 102. Methods for detecting a geographic location or entry into a defined geographic area of a computing device will be apparent to persons having skill in the relevant art. For instance, the mobile computing device 102 may report its geographic location to the merchant system 108 using a suitable method, such as via a local area network or a cellular communication network, directly or via one or more intermediate entities and/or systems, such as a mobile network operator, and the merchant system 108 may identify when the mobile computing device's geographic location is within the payment zone 106. In another example, the merchant system 108 may monitor for any electronic device inside the payment zone 106, such as via the use of a wireless area network, radio frequency network, Bluetooth, etc. and may detect the mobile computing device 102 when it appears to the merchant system 108.

Once the merchant system 108 has detected the entry of the mobile computing device 102 into the payment zone 106, the merchant system 108 may electronically transmit a data signal to the mobile computing device 102 that is superimposed or otherwise encoded with payment terms. The data signal may be transmitted using any suitable communication network, such as via the same communication network used to detect the mobile computing device 102 inside the payment zone 106. The payment terms may include a payment rate, terms and conditions for entry and/or maintained access to the payment zone 106, license agreements, liability waivers, etc. The mobile computing device 102 may parse the payment terms from the data signal and may display them to the consumer 104 using a suitable display device. The consumer 104 may then indicate acceptance of the payment terms using a suitable input device of the mobile computing device 102. The mobile computing device 102 may electronically transmit a data signal back to the merchant system 108 that is superimposed or otherwise encoded with the indicated acceptance.

In instances where the consumer 104 may decline acceptance of the payment terms, the merchant system 108 may electronically transmit a data signal back to the mobile computing device 102 that is superimposed or otherwise encoded with a notification that the consumer 104 is to exit the payment zone 106. In some instances, the merchant system 108 may also electronically transmit a notification to one or more additional computing devices, such as those associated with employees or other personnel of the corresponding merchant. For example, security personnel may be notified of the consumer's declining of the payment terms to ensure that the consumer 104 exits the payment zone 106. In some cases, the mobile computing device 102 may be instructed, such as via an internal application program or via a signal received from the merchant system 108, to play an audible alarm or other visual or auditory indicator if the consumer 104 does not exit the payment zone 106 after a predetermined period of time.

Upon entry of the mobile computing device 102 into the payment zone 106 or receipt of the payment terms, the mobile computing device 102 may register an entry timestamp associated with the payment zone 106. In some instances, the merchant system 108 may also register an entry timestamp for the mobile computing device 102 and the payment zone 106 upon receipt of the indicated acceptance of the payment terms.

Once the mobile computing device 102 exits the payment zone 106, the mobile computing device 102 may register an exit timestamp associated with the payment zone 106. In some cases, the merchant system 108 may electronically transmit a data signal to the mobile computing device 102 when the merchant system 108 detects that the mobile computing device 102 has exited the payment zone 106. Exiting of the payment zone 106 may be detected using the same methods used to detect entry into the payment zone 106, such as by identification of the device's geographic location as compared to the payment zone's geofenced, lack of detection of the mobile computing device 102 by a communication network associated with the payment zone 106, etc. In such cases, the mobile computing device 102 may register the exit timestamp upon receipt of the data signal. In some embodiments, the merchant system 108 may also register an exit timestamp for the mobile computing device 102 and the payment zone 106 upon detecting that the mobile computing device 102 has exited.

Once the mobile computing device 102 has registered the exit timestamp, the mobile computing device 102 may calculate a transaction amount for payment based on the length of time inside the payment zone 106. The mobile computing device 102 may calculate the length of time based on the entry and exit timestamps, and may then calculate the transaction amount based on the length of time and payment rate. As discussed above, the payment rate may be included in the payment terms, or, in some instances, may be stored locally in the mobile computing device 102, such as in memory associated with an application program, such as an application program associated with the merchant system 108 or payment zone 106, such as an application program configured to report geographic locations to the merchant system 108 for detection of entry and exit into payment zones 106.

The mobile computing device 102 may then electronically transmit a data signal to the merchant system 108 that is superimposed or otherwise encoded with the transaction amount and the payment details stored therein that are associated with the transaction account associated with the consumer 104 and used to fund the corresponding payment transaction. In instances where the mobile computing device 102 may include more than one set of payment details (e.g., corresponding to multiple transaction accounts), the consumer 104 may first indicate which transaction account to use to fund the payment transaction. In some such instances, the consumer 104 may indicate the transaction account during the acceptance of the payment terms.

The merchant system 108 may receive the data signal from the mobile computing device 102 and parse the transaction amount and payment details therefrom. The merchant system 108 may then initiate a payment transaction for the payment of the transaction amount to the merchant from the transaction account corresponding to the payment details. In some instances, the merchant system 108 may first verify the transaction amount, such as by performing its own calculation of the transaction amount based on its registered entry and exit timestamps. In such instances, if a discrepancy is detected by the merchant system 108, such as if the calculated transaction amount is a predetermined range or amount different from that provided by the mobile computing device 102, the merchant system 108 may request a second calculation from the mobile computing device 102 or may request approval of the transaction amount calculated by the merchant system 108 from the consumer 104 via the mobile computing device 102.

Initiation of the payment transaction by the merchant system 108 may include the electronic transmission of the transaction amount, payment details, and any other transaction data to an acquirer system 112 associated with an acquiring financial institution associated with the merchant. The acquiring financial institution may be a financial institution, such as an acquiring bank, or other entity that issues a transaction account to the merchant suitable for use in the receipt of funds in payment transactions. In some instances, the merchant system 108 may directly transmit the transaction amount, payment details, and other transaction data, collectively referred to herein as "transaction data," to the acquirer system 112 using a suitable communication network, or may transmit the transaction data to the acquirer system 112 via one or more intermediate entities, such as a gateway processor.

The acquirer system 112 may receive the transaction data and may generate a transaction message for the payment transaction. Transaction messages may be specially formatted data messages that are formatted pursuant to one or more standards governing the exchange of financial transaction messages, such as the International Organization of Standardization's ISO 8583 standard. A transaction message may include a message type indicator indicative of a type of the related payment transaction, such as an authorization request or an authorization response. A transaction message may also include a plurality of data elements, where each data element is configured to store data as set forth in the associated standard(s), which may include the transaction details and payment details. In some instances, a transaction message may also include one or more bitmaps, which may be configured to indicate the data elements included in the transaction message and the data stored therein.

The acquirer system 112 may generate a transaction message for the payment transaction that includes a message type indicator indicative of an authorization request that includes one or more data elements configured to store the payment details, a data element configured to store the transaction amount, and one or more additional data elements configured to store the additional transaction data. The additional transaction data may include, for example, a transaction time, transaction date, geographic location, point of sale data, consumer data, merchant data, offer data, reward data, loyalty data, issuer data, acquirer data, etc. In some embodiments, the merchant system 108 may generate the transaction message for the payment transaction, which may be transmitted to the acquirer system 112 thereby.

The acquirer system 112 may submit the transaction message to a payment network 114 for processing. The transaction message may be electronically transmitted to the payment network 114 via payment rails associated therewith. The payment network 114 may then process the payment transaction using traditional methods and systems, such as by seeking authorization approval by the issuer system 110. Once the payment transaction is processed, the payment network 114 may return a transaction message including a message type indicator indicative of an authorization response to the acquirer system 112 using the payment rails. The authorization response may include a data element configured to store a response code that indicates if the transaction is approved or denied (e.g., by the issuer system 110). Additional detail regarding the processing of payment transactions and exchange of transaction messages is provided below with respect to the process 600 illustrated in FIG. 6.

The acquirer system 112 may receive the authorization response and may return the authorization response or data included therein to the merchant system 108 using a suitable communication method and network. The merchant system 108 may then finalize the transaction accordingly, such as by furnishing a receipt to the consumer 104 or mobile computing device 102 if the transaction was approved, or seeking another payment method if the transaction was declined.

In some instances, the consumer 104 may enter multiple payment zones 106 with the mobile computing device 102, such as payment zones 106 that share a border or entering a second payment zone 106 within a first payment zone 106. In some such instances, the mobile computing device 102 may initiate the payment transaction with the merchant system 108 upon exiting each respective payment zone 106. In other such instances, the mobile computing device 102 may register multiple entry and exit timestamps and may initiate a single payment transaction for all payment zones 106, or a single payment transaction for each payment zone 106 entered, based on the respective entry and exit timestamps. In some cases, a single payment rate may be used for each payment zone 106, or each payment zone 106 may have a separate payment rate associated therewith. The merchant system 108 may provide payment terms to the mobile computing device 102 for each payment zone 106 upon first detection, or may transmit payment terms for each payment zone 106 upon entry to that respective payment zone 106. In latter instances, the consumer 104 may be required to indicate acceptance of the payment terms for each payment zone 106 entered.

In some embodiments, payment terms may include a limit on the amount of time in which the consumer 104 may remain in the associated payment zone 106. In such an instance, the mobile computing device 102 may be configured to visually or aurally inform the consumer 104 prior to expiration and/or when the amount of time expires. For example, the payment terms may indicate that the consumer 104 can be within a geofenced payment zone 106 for four hours. In such an example, the mobile computing device 102 may display a reminder to the consumer 104 at 60, 30, and 15 minutes remaining, and may display a reminder and audibly emit an alarm or notification when 5 minutes are remaining, so that the consumer 104 can exit the payment zone 106.

In some embodiments, indication of acceptance of payment terms by the consumer 104 may also include the payment details for the transaction account used in the subsequent payment transaction. In such embodiments, the merchant system 108 may initiate the payment transaction upon entry of the mobile computing device 102 into the payment zone 106. The transaction amount used in such an instance may be a nominal amount or may be an amount based on an approximate amount of time that the mobile computing device 102 may remain in the payment zone 106, such as based on consumer averages, a prediction provided by the consumer 104, etc. In such cases, the merchant system 108 may later provide an update to the transaction amount once the mobile computing device 102 has exited the payment zone 106 and calculated the transaction amount, which may be used in the clearing of the payment transaction. In such cases, the payment transaction may be processed and cleared using a traditional method for payment transactions where transaction amounts may be modified, such as due to gratuity.

Methods and systems discussed herein may enable a merchant to charge a consumer for an amount of time in which the consumer accesses a geofenced payment zone 106. By using mobile computing devices 102, such a system may be implemented using existing computing systems and infrastructure of the merchant systems 108. In addition, the use of mobile computing devices 102 for each consumer 104 may enable the merchant system 108 to accommodate a significant number (e.g., thousands) of consumers entering and exiting the payment zone 106 at any given time. As such, the systems discussed herein provide a technological solution that can enable a merchant system 108 to initiate time- and location-based transactions for consumer access to one or more payment zones more efficiently and effectively.

Mobile Computing Device

Figure 2:
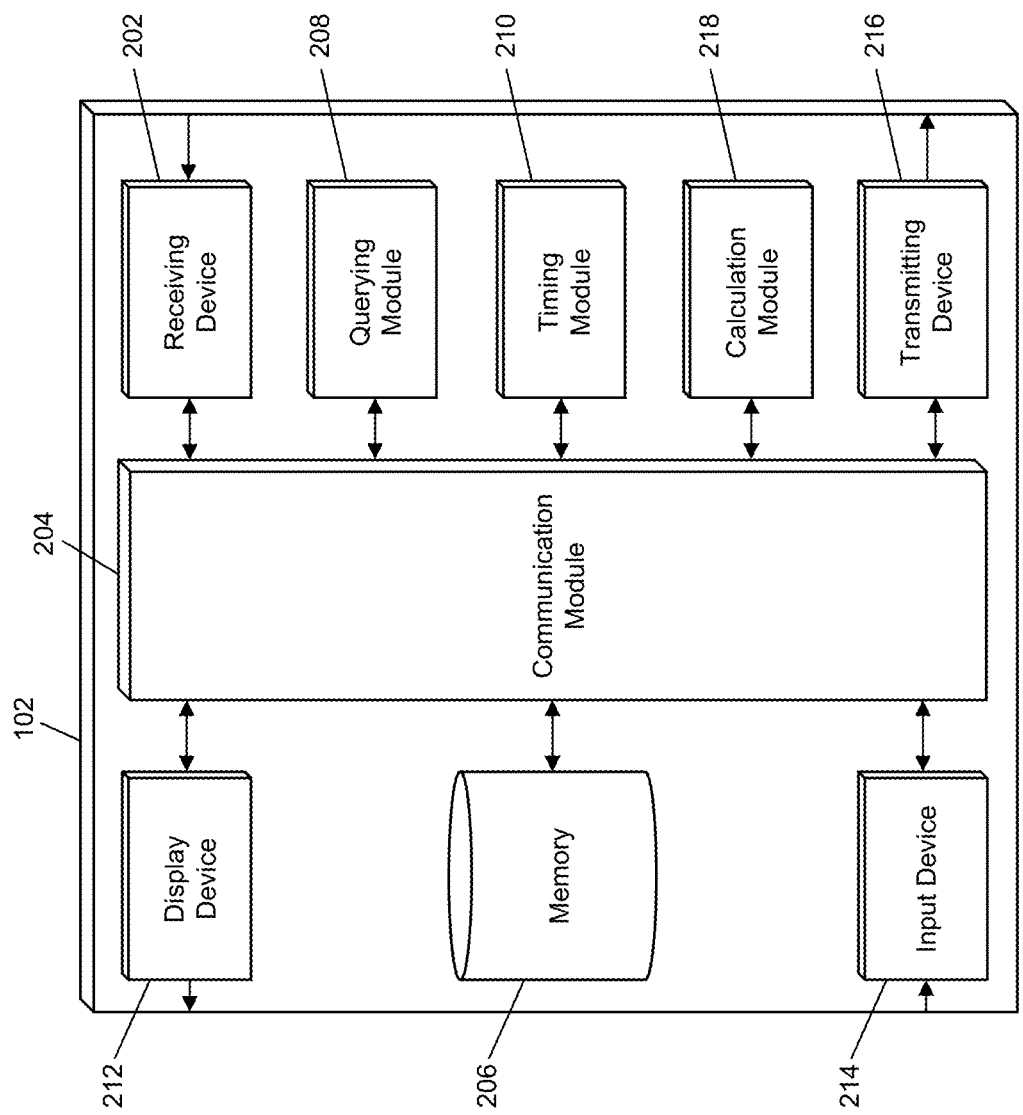
FIG. 2 is a block diagram illustrating the mobile computing device of FIG. 1 for the initiating of time- and location-based transactions in accordance with exemplary embodiments.

FIG. 2 illustrates an embodiment of the mobile computing device 102 of the system 100. It will be apparent to persons having skill in the relevant art that the embodiment of the mobile computing device 102 illustrated in FIG. 2 is provided as illustration only and may not be exhaustive to all possible configurations of the mobile computing device 102 suitable for performing the functions as discussed herein. For example, the computer system 700 illustrated in FIG. 7 and discussed in more detail below may be a suitable configuration of the mobile computing device 102.

The mobile computing device 102 may include a receiving device 202. The receiving device 202 may be configured to receive data over one or more networks via one or more network protocols. In some embodiments, the receiving device 202 may be configured to receive data over the payment rails, such as using specially configured infrastructure associated with payment networks 114 for the transmission of transaction messages that include sensitive financial data and information. In some instances, the receiving device 202 may also be configured to receive data from issuer systems 110, merchant systems 108, payment networks 114, and other entities via alternative networks, such as the Internet. In some embodiments, the receiving device 202 may be comprised of multiple devices, such as different receiving devices for receiving data over different networks, such as a first receiving device for receiving data over payment rails and a second receiving device for receiving data over the Internet. The receiving device 202 may receive data signals that are electronically transmitted, where data may be superimposed on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by issuer systems 110 that may be superimposed or otherwise encoded with payment details associated with a transaction account. The receiving device 202 may also be configured to receive data signals electronically transmitted by merchant systems 108 that are superimposed or otherwise encoded with entry and exit notifications, which may include payment terms. The receiving device 202 may also receive additional data signals electronically transmitted by merchant systems 108, such as may be superimposed or otherwise encoded with alternative or updated transaction amounts for payment transactions, receipts for payment transactions, etc. In some instances, the receiving device 202 may receive data signals electronically transmitted by the payment network 114 or issuer system 110 that are superimposed or otherwise encoded with receipts for payment transactions initiated with the merchant system 108.

The mobile computing device 102 may also include a communication module 204. The communication module 204 may be configured to transmit data between modules, engines, databases, memories, and other components of the mobile computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the mobile computing device 102 and external components of the mobile computing device 102, such as externally connected databases, display devices, input devices, etc. The mobile computing device 102 may also include a processing device. The processing device may be configured to perform the functions of the mobile computing device 102 discussed herein as will be apparent to persons having skill in the relevant art. In some embodiments, the processing device may include and/or be comprised of a plurality of engines and/or modules specially configured to perform one or more functions of the processing device, such as a querying module 208, timing module 210, calculation module 218, etc. As used herein, the term "module" may be software or hardware particularly programmed to receive an input, perform one or more processes using the input, and provide an output. The input, output, and processes performed by various modules will be apparent to one skilled in the art based upon the present disclosure.

The mobile computing device 102 may also include a memory 206. The memory 206 may be configured to store data for use by the mobile computing device 102 in performing the functions discussed herein. The memory 206 may be configured to store data using suitable data formatting methods and schema and may be any suitable type of memory, such as read-only memory, random access memory, etc. The memory 206 may include, for example, encryption keys and algorithms, communication protocols and standards, data formatting standards and protocols, program code for modules and application programs of the processing device, and other data that may be suitable for use by the mobile computing device 102 in the performance of the functions disclosed herein as will be apparent to persons having skill in the relevant art. In some embodiments, the memory 206 may be comprised of or may otherwise include a relational database that utilizes structured query language for the storage, identification, modifying, updating, accessing, etc. of structured data sets stored therein.

The memory 206 may be configured to store payment details provisioned to the mobile computing device 102 by one or more issuer systems 110. The memory 206 may also be configured to store payment rates and other data included in payment terms received from merchant systems 108 via the receiving device 202. The memory 206 may also be configured to store timestamps associated with payment zones 106. In some embodiments, the memory 206 may also be configured to store program code for an application program configured to perform functions associated with the mobile computing device 102 discussed herein, such as for the reporting of geographic locations to merchant systems 108, detection of payment zones 106, display or aural emission of time-related notifications, etc.

The mobile computing device 102 may include a querying module 208. The querying module 208 may be configured to execute queries on databases to identify information. The querying module 208 may receive one or more data values or query strings, and may execute a query string based thereon on an indicated database, such as the memory 206, to identify information stored therein. The querying module 208 may then output the identified information to an appropriate engine or module of the mobile computing device 102 as necessary. The querying module 208 may, for example, execute a query on the memory 206 to identify payment details stored therein for use in a payment transaction. The querying module 208 may also execute a query on the memory 206 to identify registered timestamps and a payment rate for use in calculation of a transaction amount.

The mobile computing device 102 may also include a timing module 210. The timing module 210 may be configured to register timestamps. The timing module 210 may receive an instruction to register a timestamp as input, which may be accompanied by data for association with the timestamp, may register the timestamp, and may output the registered timestamp to another module or engine of the mobile computing device 102. For example, the timing module 210 may be configured to register a timestamp associated with entry or exit into a payment zone 106, which may be provided to the querying module 208 for storage into the memory 206.

The mobile computing device 102 may also include a display device 212. The display device 212 may be configured to display data to the consumer 104 using any suitable method of display. The display device 212 may be, for example, a liquid crystal display, light emitting diode display, thin film transistor display, capacitive touch display, etc. In some instances, the mobile computing device 102 may include more than one display device 212, where each display device 212 may be the same or one of a plurality of different types. The display device 212 may be configured to display payment terms received from the merchant system 108 (e.g., via the receiving device 202) to the consumer 104.

The mobile computing device 102 may also include an input device 214. The input device 214 may be configured to receive input from the consumer 104 for use in conjunction with the functions of the mobile computing device 102 as discussed herein. The input device 214 may be, for example, a keyboard, click wheel, scroll wheel, track pad, microphone, camera, capacitive touch display, stylus, etc. In some instances, the mobile computing device 102 may include more than one input device 214, where each input device 214 may be the same or one of a plurality of different types. The input device 214 may be configured to receive input from the consumer 104 indicating acceptance or denial of payment terms for access to one or more payment zones 106.

The mobile computing device 102 may also include a calculation module 218. The calculation module 218 may be configured to perform calculations for use by the mobile computing device 102 in performing the functions discussed herein. The calculation module 218 may receive data and instructions related thereto as input, may perform one or more calculations as instructed, and may output the result of the calculation to another module or engine of the mobile computing device 102. For example, the calculation module 218 may be configured to calculate a length of time in a payment zone 106 based on one or more sets of timestamps (e.g., as registered by the timing module 210 and read from the memory 206 by the querying module 208), where each set of timestamps may include both an entry and exit timestamp for the payment zone 106. The calculation module 218 may also be configured to calculate a transaction amount for each payment zone 106 based on the associated length of time and a corresponding payment rate (e.g., read from the memory 206 via the querying module 208). In some instances, the calculation module 218 may also be configured to sum transaction amounts, such as in instances where multiple payment zones 106 were accessed and will be paid for in a single payment transaction.

The mobile computing device 102 may also include a transmitting device 216. The transmitting device 216 may be configured to transmit data over one or more networks via one or more network protocols. In some embodiments, the transmitting device 216 may be configured to transmit data over the payment rails, such as using specially configured infrastructure associated with payment networks 114 for the transmission of transaction messages that include sensitive financial data and information, such as identified payment credentials. In some instances, the transmitting device 216 may be configured to transmit data to issuer systems 110, merchant systems 108, payment networks 114, and other entities via alternative networks, such as the Internet. In some embodiments, the transmitting device 216 may be comprised of multiple devices, such as different transmitting devices for transmitting data over different networks, such as a first transmitting device for transmitting data over the payment rails and a second transmitting device for transmitting data over the Internet. The transmitting device 216 may electronically transmit data signals that have data superimposed that may be parsed by a receiving computing device. In some instances, the transmitting device 216 may include one or more modules for superimposing, encoding, or otherwise formatting data into data signals suitable for transmission.

The transmitting device 216 may be configured to electronically transmit data signals to issuer systems 110 that are superimposed or otherwise encoded with data requests requesting payment details for a transaction account for use in initiating payment transactions via the mobile computing device 102. The transmitting device 216 may also be configured to electronically transmit data signals to merchant systems 108 that are superimposed or otherwise encoded with indications of acceptance or denial of payment terms, and payment details and transaction amounts for payment transactions related to access to payment zones 106.

Initiation of a Time- and Location-Based Geographic Transaction

Figure 3A:
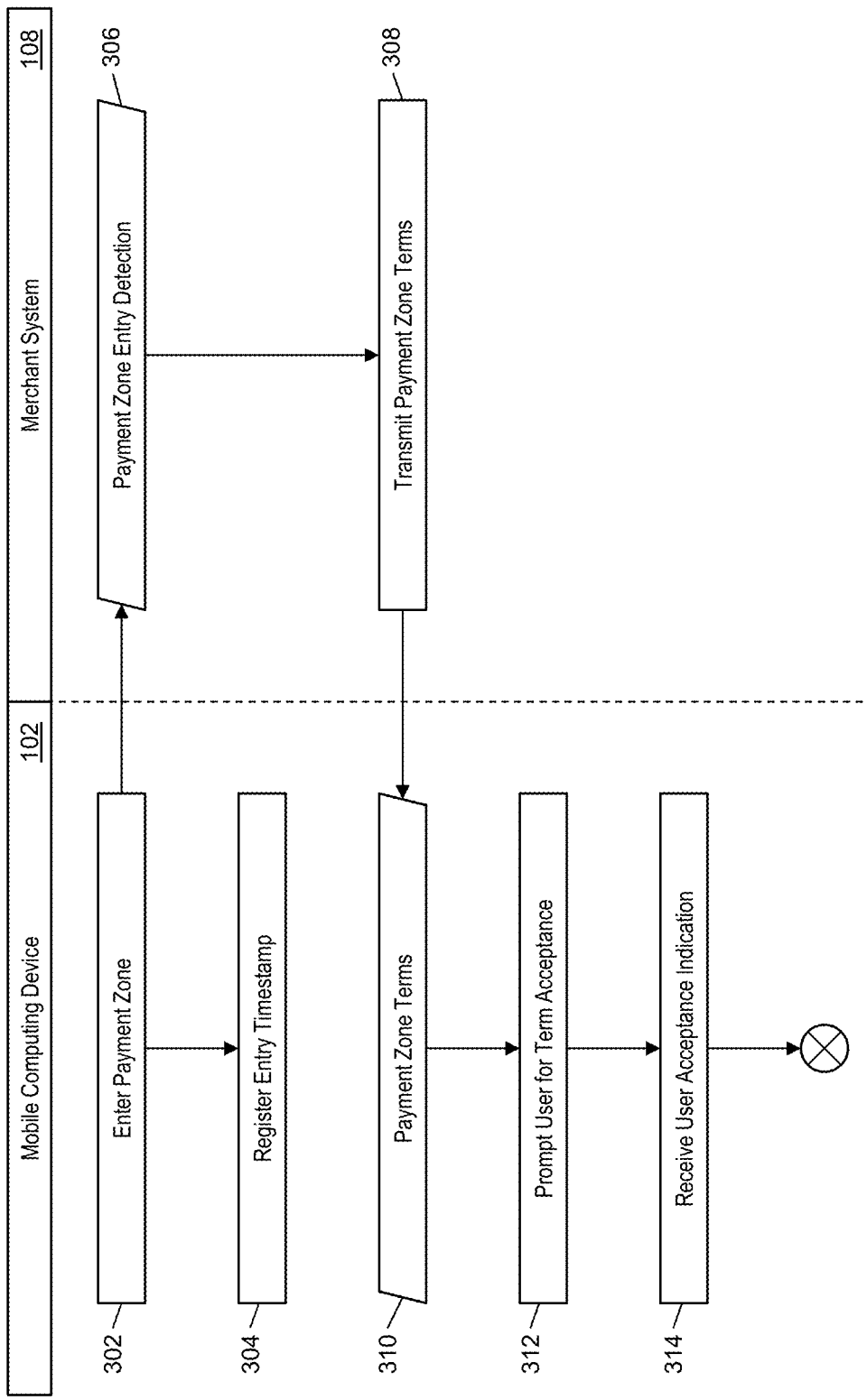
FIGS. 3A and 3B are a flow diagram illustrating a process for initiating a time- and location-based transaction based on consumer access to a geofenced payment zone in accordance with exemplary embodiments.
Figure 3B:
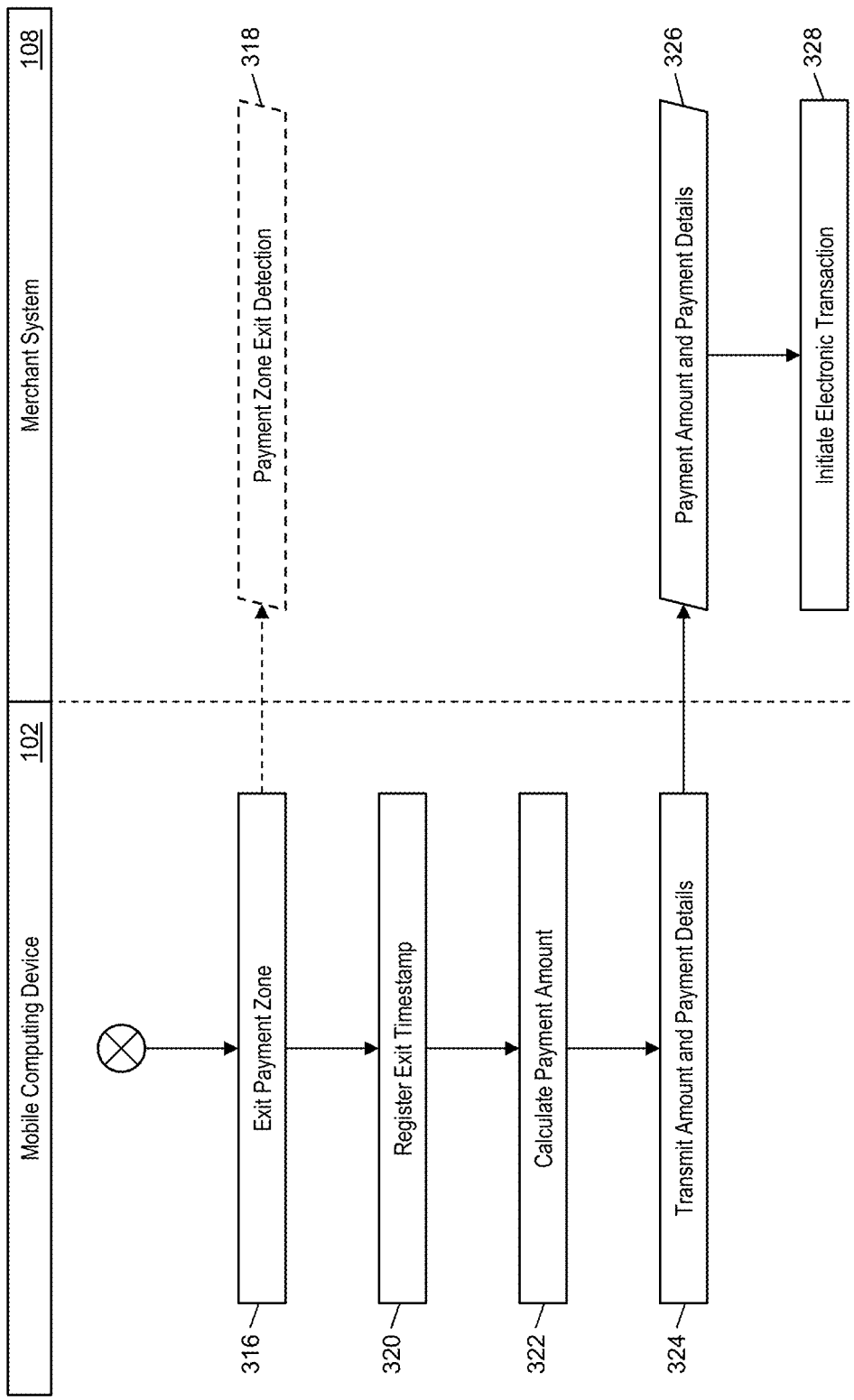

FIGS. 3A and 3B illustrate a process for the initiation of a time- and location-based geographic transaction associated with access to a geofenced payment zone 106 by a consumer 104 measured via a mobile computing device 102.

In step 302, the mobile computing device 102 may enter a payment zone 106. In step 304, the timing module 210 of the mobile computing device 102 may register an entry timestamp for entry into the payment zone 106. The entry timestamp may be stored in the memory 206 via execution of a query thereon by the querying module 208 of the mobile computing device 102. In the example illustrated in FIGS. 3A and 3B, the entry into the payment zone 106 may be detected by the mobile computing device 102. For example, the mobile computing device 102 may store (e.g., in the memory 206) geofencing data associated with the payment zone 106 and may detect the geographic location of the mobile computing device 102 and identify entry into the payment zone 106. In alternative embodiments, the merchant system 108 may detect entry into the payment zone 106 by the mobile computing device 102 and may electronically transmit a data signal to the mobile computing device 102 for notification thereof.

In step 306, the merchant system 108 may receive a data signal electronically transmitted to the merchant system 108 by the transmitting device 216 of the mobile computing device 102 that is superimposed or otherwise encoded with a payment zone entry detection notification. The notification may include data identifying the mobile computing device 102 and the payment zone 106. In some instances, the notification may also include the entry timestamp registered by the mobile computing device 102, payment details, or other data. Data identifying the mobile computing device 102 may include any identification value associated with the mobile computing device 102, such as a media access control address, internet protocol address, username, e-mail address, telephone number, identification number, application number, registration number, serial number, etc.

In step 308, the merchant system 108 may electronically transmit a data signal back to the mobile computing device 102 that is superimposed or otherwise encoded with payment terms associated with the payment zone 106. In step 310, the receiving device 202 of the mobile computing device 102 may receive and parse the data signal. The payment terms parsed therefrom may include a payment rate, liability terms, a liability waiver, time restrictions, entry requirements, etc. In step 312, the display device 212 of the mobile computing device 102 may display the payment terms to the consumer 104 along with a prompt for the consumer 104 to provide acceptance or denial of the payment terms. In step 314, the input device 214 of the mobile computing device 102 may receive the consumer's input indicating acceptance, or denial, if applicable, to the payment terms.

In step 316, the mobile computing device 102 may exit the payment zone 106. In some embodiments, the transmitting device 216 of the mobile computing device 102 may electronically transmit a data signal to the merchant system 108 that is superimposed or otherwise encoded with a notification that the mobile computing device 102 has exited the payment zone. In such an embodiment, the process may also include step 318 where the merchant system 108 may receive the notification, which may include the information identifying the mobile computing device 102, the payment zone 106, an exit timestamp, and any other suitable data. In step 320, the timing module 210 of the mobile computing device 102 may register an exit timestamp for the exit of the payment zone 106, which may be stored in the memory 206 by the querying module 208.

In step 322, the calculation module 218 of the mobile computing device 102 may calculate a length of time that the mobile computing device 102 remained in the payment zone 106 based on the entry and exit timestamps, and may then calculate a payment amount for the access to the payment zone 106 based on the associated payment rate and the calculated length of time. In step 324, the transmitting device 216 of the mobile computing device 102 may electronically transmit a data signal superimposed or otherwise encoded with the calculated payment amount and the payment details (e.g., read from the memory 206 via the querying module 208) for the transaction account to be used to fund the payment transaction to the merchant system 108. In step 326, the merchant system 108 may receive the transaction amount and payment details and, in step 328, may initiate an electronic payment transaction for payment of the transaction amount from the transaction account to a transaction account associated with the merchant.

Payment Zones

Figure 4:
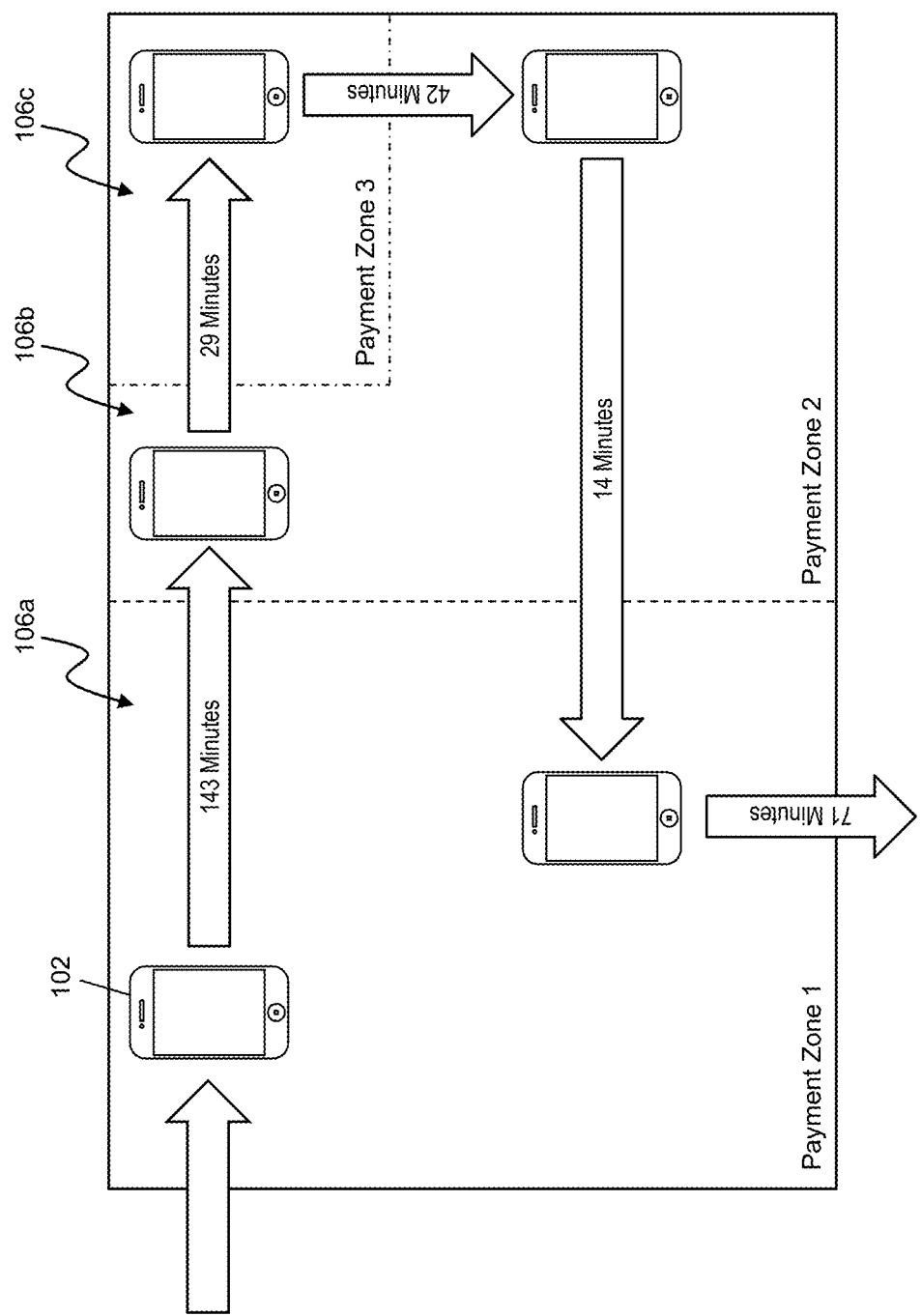
FIG. 4 is a diagram illustrating consumer access to a plurality of payment zones and charging thereof using the system of FIG. 1 in accordance with exemplary embodiments.

FIG. 4 illustrates an example of movement of the mobile computing device 102 through a plurality of different payment zones 106 and the calculation of transaction amounts associated therewith for payment in a payment transaction.

In the example illustrated in FIG. 4, the mobile computing device 102 may enter into three different payment zones 106, illustrated as payment zones 106a, 106b, and 106c. In the illustrated example, the mobile computing device 102 may enter payment zone 106a and remain there for 143 minutes (e.g., as calculated by the calculation module 218 via entry and exit timestamps registered by the timing module 210) before entering into payment zone 106b. The mobile computing device 102 may remain in payment zone 106b for 29 minutes before entering payment zone 106c. After being in payment zone 106c for 42 minutes, the mobile computing device 102 may return to payment zone 106b for 14 minutes and then remain in payment zone 106a for 71 minutes before exiting all of the payment zones 106.

In one embodiment, the mobile computing device 102 may initiate a time- and location-based payment transaction for each period of time in a payment zone 106 separately. In such an embodiment, the mobile computing device 102 may initiate a first payment transaction for payment of a transaction amount based on the 143 minutes in payment zone 106a, then a second payment transaction for a transaction amount based on the 29 minutes in payment zone 106b, a third transaction for the 42 minutes in payment zone 106c, a fourth transaction for the 14 minutes back in payment zone 106b, and a fifth transaction for the 71 minutes back in payment zone 106a.

In another embodiment, the mobile computing device 102 may initiate a single time- and location-based payment transaction for each payment zone 106 entered. In such an embodiment, the mobile computing device 102 may initiate separate payment transactions once the mobile computing device 102 has left all payment zones 106, or may initiate a payment transaction for a payment zone 106 that has been left and will not be reentered, such as may be indicated by the consumer 104 via the input device 214 of the mobile computing device. The mobile computing device 102 may thus initiate a payment transaction for payment of a transaction amount based on the combined 214 minutes in payment zone 106a, a payment transaction for payment based on the combined 43 minutes in payment zone 106b, and a payment transaction for the 42 minutes in payment zone 106c.

In another embodiment, the mobile computing device 102 may initiate a single time- and location-based payment transaction for all payment zones 106 entered by the mobile computing device 102. In such an instance, once the mobile computing device 102 has exited all of the payment zones (e.g., once the mobile computing device 102 leaves payment zone 106a and does not detect entry into any other payment zone 106) the calculation module 218 of the mobile computing device 102 may calculate a single transaction amount based on the times and associated payment rates for each payment zone. The mobile computing device 102 may then initiate a single payment transaction for the transaction amount that covers the time in each of the payment zones 106 entered by the mobile computing device 102.

In some embodiments, payment zones may be independent. For example, entry of the mobile computing device 102 into payment zone 106b from payment zone 106a may stop incurring charges from payment zone 106a. In other embodiments, a payment zone 106 may be a subset of another payment zone 106. In an example, entry of the mobile computing device 102 into the payment zone 106b from payment zone 106a may continue to incur charges for payment zone 106a, in addition to incurring charges for time spent in the payment zone 106b. For instance, payment zone 106b may be a premium, restricted access area of a venue where the attendee may incur additional charges for being in the premium area in addition to charges incurred for attending the venue.

Figure 5:
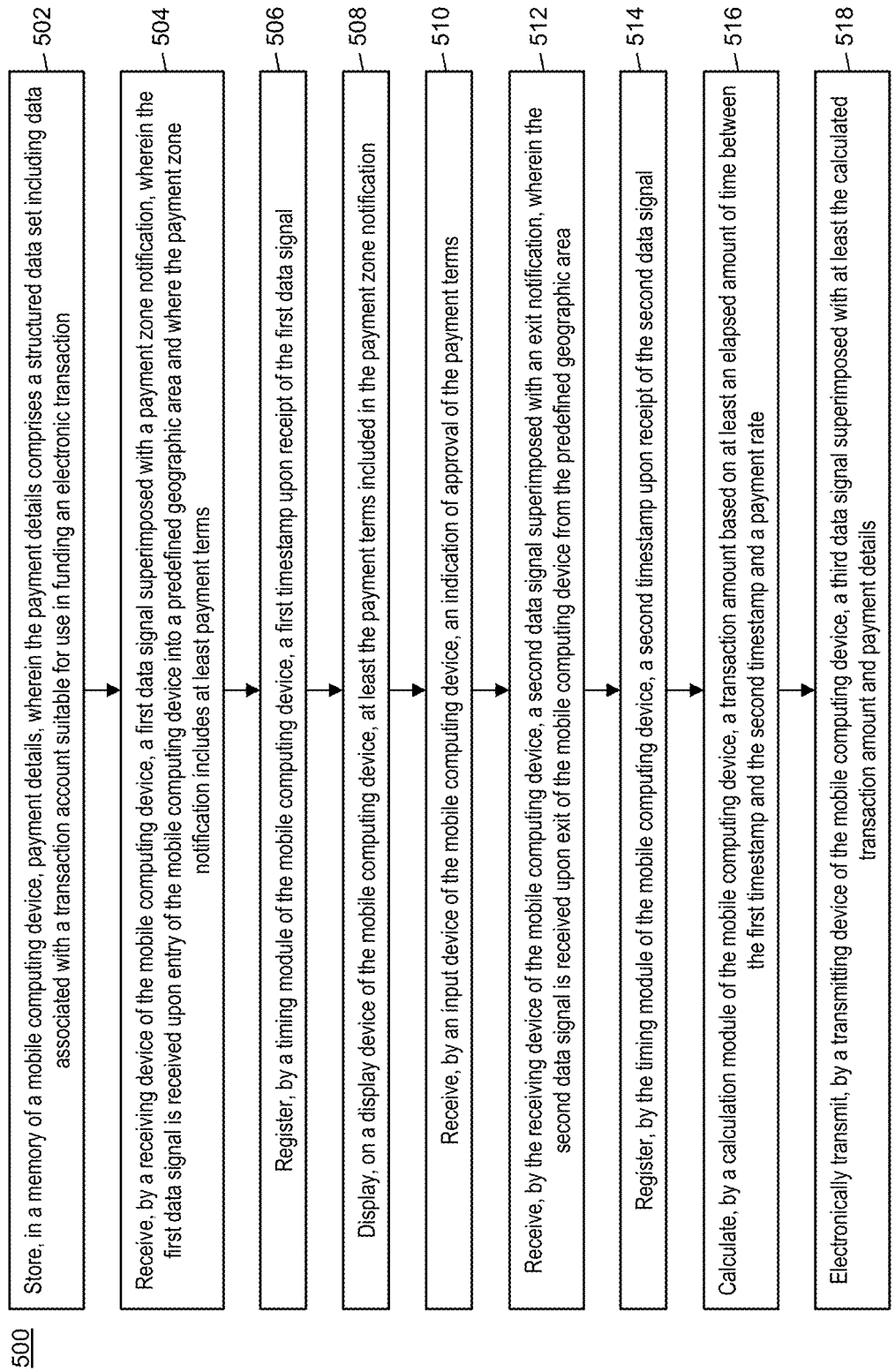
FIG. 5 is a flow chart illustrating an exemplary method for submitting data captured in a transaction message to a blockchain in accordance with exemplary embodiments.

Exemplary Method for Initiating a Time- and Geographic-Based Electronic Transaction FIG. 5 illustrates a method 500 for the initiation of an electronic payment transaction based on an amount of time in which a mobile computing device has access a geofenced payment zone.

In step 502, payment details may be stored in a memory (e.g., the memory 206) of a mobile computing device (e.g., the mobile computing device 102), wherein the payment details comprises a structured data set including data associated with a transaction account suitable for use in funding an electronic transaction. In step 504, a first data signal superimposed with a payment zone notification may be received by a receiving device (e.g., the receiving device 202) of the mobile computing device, wherein the first data signal is received upon entry of the mobile computing device into a predefined geographic area (e.g., payment zone 106) and where the payment zone notification includes at least payment terms. In step 506, a first timestamp may be registered for a timing module (e.g., the timing module 210) of the mobile computing device upon receipt of the first data signal.

In step 508, at least the payment terms included in the payment zone notification may be displayed on a display device (e.g., the display device 212) of the mobile computing device. In step 510, an indication of approval of the payment terms may be received by an input device (e.g., the input device 214) of the mobile computing device. In step 512, a second data signal superimposed with an exit notification may be received by the receiving device of the mobile computing device, wherein the second data signal is received upon exit of the mobile computing device from the predefined geographic area.

In step 514, a second timestamp may be registered by the timing module of the mobile computing device upon receipt of the second data signal. In step 516, a transaction amount may be calculated by a calculation module (e.g., the calculation module 218) of the mobile computing device based on at least an elapsed amount of time between the first timestamp and the second timestamp and a payment rate. In step 518, a third data signal superimposed with at least the calculated transaction amount and payment details may be electronically transmitted by a transmitting device (e.g., the transmitting device 216) of the mobile computing device.

In one embodiment, the payment terms may further include the payment rate. In some embodiments, the first and second data signal may be received from an external computing device, and the third data signal may be electronically transmitted to the external computing device. In other embodiments, the first and second data signal may be received via internal communication of the mobile computing device.

In one embodiment, the payment terms may further include communication data, and the third data signal may be electronically transmitted to an external computing device based on the communication data. In some embodiments, the method 500 may further include storing, in the memory of the mobile computing device, the payment rate. In one embodiment, the third data signal may be further superimposed with the first timestamp and the second timestamp.

In some embodiments, the method 500 may also include: receiving, by the receiving device of the mobile computing device, a fourth data signal superimposed with a second exit notification, wherein the fourth data signal is received upon exit of the mobile computing device from a second predefined geographic area; and registering, by the timing module of the mobile computing device, a third timestamp upon receipt of the fourth data signal, wherein the transaction amount is further based on a second elapsed amount of time between the second timestamp and the third timestamp and a second payment rate. In a further embodiment, the second payment rate may be equivalent to the payment rate. In another further embodiment, the exit notification superimposed on the second data signal may include revised payment terms, the revised payment terms including the second payment rate. In an even further embodiment, the method 500 may further include displaying, on the display device of the mobile computing device, at least the revised payment terms included in the exit notification; and receiving, by the input device of the mobile computing device, an indication of approval of the revised payment terms.

Payment Transaction Processing System and Process

Figure 6:
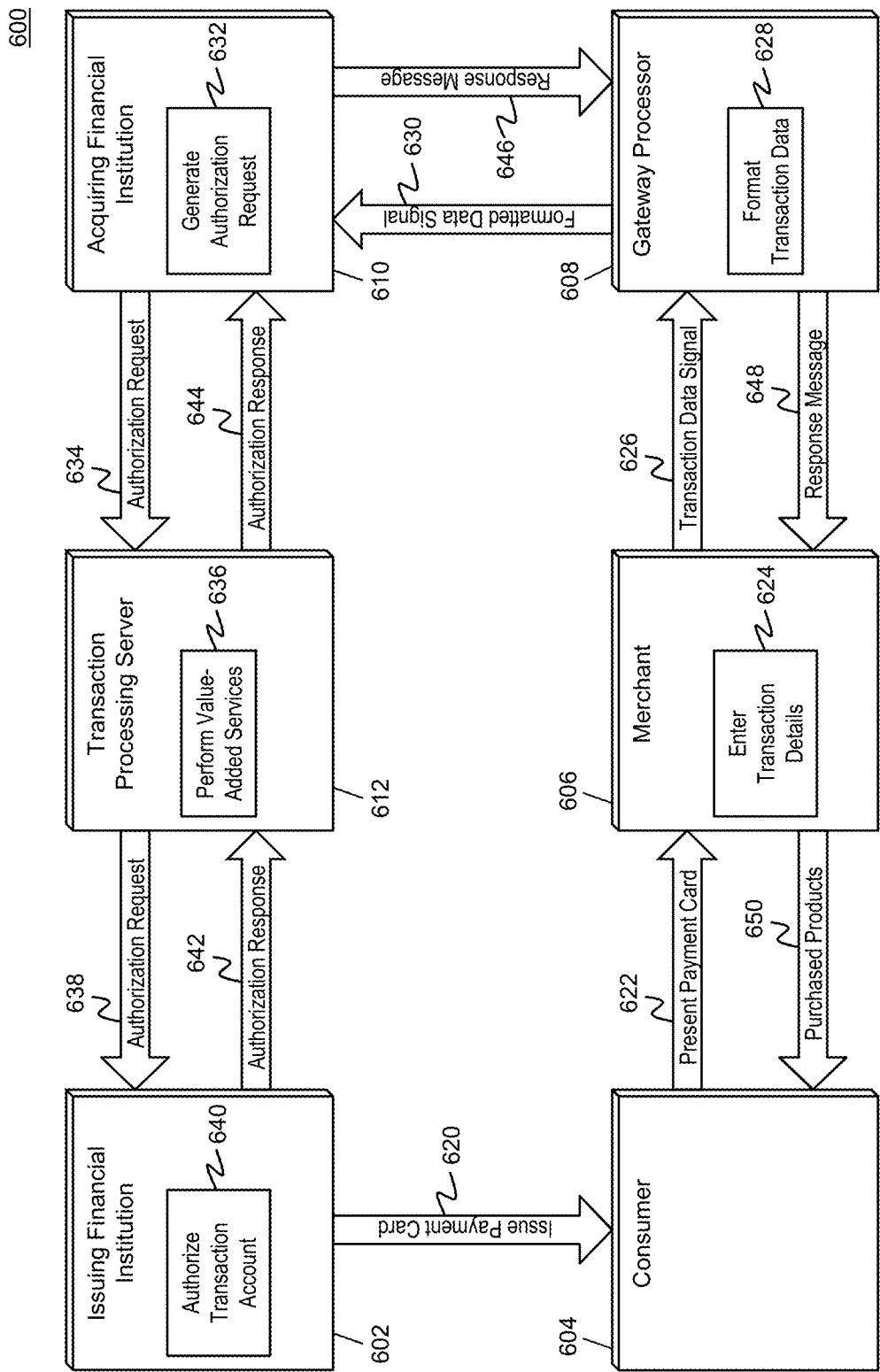
FIG. 6 is a flow diagram illustrating the processing of a payment transaction in accordance with exemplary embodiments.

FIG. 6 illustrates a transaction processing system and a process 600 for the processing of payment transactions in the system, which may include the processing of thousands, millions, or even billions of transactions during a given period (e.g., hourly, daily, weekly, etc.). The process 600 and steps included therein may be performed by one or more components of the system 100 discussed above, such as the mobile computing device 102, consumer 104, merchant system 108, issuer system 110, acquirer system 112, payment network 114, etc. The processing of payment transactions using the system and process 600 illustrated in FIG. 6 and discussed below may utilize the payment rails, which may be comprised of the computing devices and infrastructure utilized to perform the steps of the process 600 as specially configured and programmed by the entities discussed below, including the transaction processing server 612, which may be associated with one or more payment networks configured to processing payment transactions. It will be apparent to persons having skill in the relevant art that the process 600 may be incorporated into the processes illustrated in FIGS. 3A, 3B, and 5, discussed above, with respect to the step or steps involved in the processing of a payment transaction. In addition, the entities discussed herein for performing the process 600 may include one or more computing devices or systems configured to perform the functions discussed below. For instance, the merchant 606 may be comprised of one or more point of sale devices, a local communication network, a computing server, and other devices configured to perform the functions discussed below.

In step 620, an issuing financial institution 602 may issue a payment card or other suitable payment instrument to a consumer 604. The issuing financial institution may be a financial institution, such as a bank, or other suitable type of entity that administers and manages payment accounts and/or payment instruments for use with payment accounts that can be used to fund payment transactions. The consumer 604 may have a transaction account with the issuing financial institution 602 for which the issued payment card is associated, such that, when used in a payment transaction, the payment transaction is funded by the associated transaction account. In some embodiments, the payment card may be issued to the consumer 604 physically. In other embodiments, the payment card may be a virtual payment card or otherwise provisioned to the consumer 604 in an electronic format.

In step 622, the consumer 604 may present the issued payment card to a merchant 606 for use in funding a payment transaction. The merchant 606 may be a business, another consumer, or any entity that may engage in a payment transaction with the consumer 604. The payment card may be presented by the consumer 604 via providing the physical card to the merchant 606, electronically transmitting (e.g., via near field communication, wireless transmission, or other suitable electronic transmission type and protocol) payment details for the payment card, or initiating transmission of payment details to the merchant 606 via a third party. The merchant 606 may receive the payment details (e.g., via the electronic transmission, via reading them from a physical payment card, etc.), which may include at least a transaction account number associated with the payment card and/or associated transaction account. In some instances, the payment details may include one or more application cryptograms, which may be used in the processing of the payment transaction.

In step 624, the merchant 606 may enter transaction details into a point of sale computing system. The transaction details may include the payment details provided by the consumer 604 associated with the payment card and additional details associated with the transaction, such as a transaction amount, time and/or date, product data, offer data, loyalty data, reward data, merchant data, consumer data, point of sale data, etc. Transaction details may be entered into the point of sale system of the merchant 606 via one or more input devices, such as an optical bar code scanner configured to scan product bar codes, a keyboard configured to receive product codes input by a user, etc. The merchant point of sale system may be a specifically configured computing device and/or special purpose computing device intended for the purpose of processing electronic financial transactions and communicating with a payment network (e.g., via the payment rails). The merchant point of sale system may be an electronic device upon which a point of sale system application is run, wherein the application causes the electronic device to receive and communicated electronic financial transaction information to a payment network. In some embodiments, the merchant 606 may be an online retailer in an e-commerce transaction. In such embodiments, the transaction details may be entered in a shopping cart or other repository for storing transaction data in an electronic transaction as will be apparent to persons having skill in the relevant art.

In step 626, the merchant 606 may electronically transmit a data signal superimposed with transaction data to a gateway processor 608. The gateway processor 608 may be an entity configured to receive transaction details from a merchant 606 for formatting and transmission to an acquiring financial institution 610. In some instances, a gateway processor 608 may be associated with a plurality of merchants 606 and a plurality of acquiring financial institutions 610. In such instances, the gateway processor 608 may receive transaction details for a plurality of different transactions involving various merchants, which may be forwarded on to appropriate acquiring financial institutions 610. By having relationships with multiple acquiring financial institutions 610 and having the requisite infrastructure to communicate with financial institutions using the payment rails, such as using application programming interfaces associated with the gateway processor 608 or financial institutions used for the submission, receipt, and retrieval of data, a gateway processor 608 may act as an intermediary for a merchant 606 to be able to conduct payment transactions via a single communication channel and format with the gateway processor 608, without having to maintain relationships with multiple acquiring financial institutions 610 and payment processors and the hardware associated thereto. Acquiring financial institutions 610 may be financial institutions, such as banks, or other entities that administers and manages payment accounts and/or payment instruments for use with payment accounts. In some instances, acquiring financial institutions 610 may manage transaction accounts for merchants 606. In some cases, a single financial institution may operate as both an issuing financial institution 602 and an acquiring financial institution 610.

The data signal transmitted from the merchant 606 to the gateway processor 608 may be superimposed with the transaction details for the payment transaction, which may be formatted based on one or more standards. In some embodiments, the standards may be set forth by the gateway processor 608, which may use a unique, proprietary format for the transmission of transaction data to/from the gateway processor 608. In other embodiments, a public standard may be used, such as the International Organization for Standardization's ISO 8683 standard. The standard may indicate the types of data that may be included, the formatting of the data, how the data is to be stored and transmitted, and other criteria for the transmission of the transaction data to the gateway processor 608.

In step 628, the gateway processor 608 may parse the transaction data signal to obtain the transaction data superimposed thereon and may format the transaction data as necessary. The formatting of the transaction data may be performed by the gateway processor 608 based on the proprietary standards of the gateway processor 608 or an acquiring financial institution 610 associated with the payment transaction. The proprietary standards may specify the type of data included in the transaction data and the format for storage and transmission of the data. The acquiring financial institution 610 may be identified by the gateway processor 608 using the transaction data, such as by parsing the transaction data (e.g., deconstructing into data elements) to obtain an account identifier included therein associated with the acquiring financial institution 610. In some instances, the gateway processor 608 may then format the transaction data based on the identified acquiring financial institution 610, such as to comply with standards of formatting specified by the acquiring financial institution 610. In some embodiments, the identified acquiring financial institution 610 may be associated with the merchant 606 involved in the payment transaction, and, in some cases, may manage a transaction account associated with the merchant 606.

In step 630, the gateway processor 608 may electronically transmit a data signal superimposed with the formatted transaction data to the identified acquiring financial institution 610. The acquiring financial institution 610 may receive the data signal and parse the signal to obtain the formatted transaction data superimposed thereon. In step 632, the acquiring financial institution may generate an authorization request for the payment transaction based on the formatted transaction data. The authorization request may be a specially formatted transaction message that is formatted pursuant to one or more standards, such as the ISO 8683 standard and standards set forth by a payment processor used to process the payment transaction, such as a payment network. The authorization request may be a transaction message that includes a message type indicator indicative of an authorization request, which may indicate that the merchant 606 involved in the payment transaction is requesting payment or a promise of payment from the issuing financial institution 602 for the transaction. The authorization request may include a plurality of data elements, each data element being configured to store data as set forth in the associated standards, such as for storing an account number, application cryptogram, transaction amount, issuing financial institution 602 information, etc.

In step 634, the acquiring financial institution 610 may electronically transmit the authorization request to a transaction processing server 612 for processing. The transaction processing server 612 may be comprised of one or more computing devices as part of a payment network configured to process payment transactions. In some embodiments, the authorization request may be transmitted by a transaction processor at the acquiring financial institution 610 or other entity associated with the acquiring financial institution. The transaction processor may be one or more computing devices that include a plurality of communication channels for communication with the transaction processing server 612 for the transmission of transaction messages and other data to and from the transaction processing server 612. In some embodiments, the payment network associated with the transaction processing server 612 may own or operate each transaction processor such that the payment network may maintain control over the communication of transaction messages to and from the transaction processing server 612 for network and informational security.

In step 636, the transaction processing server 612 may perform value-added services for the payment transaction. Value-added services may be services specified by the issuing financial institution 602 that may provide additional value to the issuing financial institution 602 or the consumer 604 in the processing of payment transactions. Value-added services may include, for example, fraud scoring, transaction or account controls, account number mapping, offer redemption, loyalty processing, etc. For instance, when the transaction processing server 612 receives the transaction, a fraud score for the transaction may be calculated based on the data included therein and one or more fraud scoring algorithms and/or engines. In some instances, the transaction processing server 612 may first identify the issuing financial institution 602 associated with the transaction, and then identify any services indicated by the issuing financial institution 602 to be performed. The issuing financial institution 602 may be identified, for example, by data included in a specific data element included in the authorization request, such as an issuer identification number. In another example, the issuing financial institution 602 may be identified by the primary account number stored in the authorization request, such as by using a portion of the primary account number (e.g., a bank identification number) for identification.

In step 638, the transaction processing server 612 may electronically transmit the authorization request to the issuing financial institution 602. In some instances, the authorization request may be modified, or additional data included in or transmitted accompanying the authorization request as a result of the performance of value-added services by the transaction processing server 612. In some embodiments, the authorization request may be transmitted to a transaction processor (e.g., owned or operated by the transaction processing server 612) situated at the issuing financial institution 602 or an entity associated thereof, which may forward the authorization request to the issuing financial institution 602.

In step 640, the issuing financial institution 602 may authorize the transaction account for payment of the payment transaction. The authorization may be based on an available credit amount for the transaction account and the transaction amount for the payment transaction, fraud scores provided by the transaction processing server 612, and other considerations that will be apparent to persons having skill in the relevant art. The issuing financial institution 602 may modify the authorization request to include a response code indicating approval (e.g., or denial if the transaction is to be denied) of the payment transaction. The issuing financial institution 602 may also modify a message type indicator for the transaction message to indicate that the transaction message is changed to be an authorization response. In step 642, the issuing financial institution 602 may transmit (e.g., via a transaction processor) the authorization response to the transaction processing server 612.

In step 644, the transaction processing server 612 may forward the authorization response to the acquiring financial institution 610 (e.g., via a transaction processor). In step 646, the acquiring financial institution may generate a response message indicating approval or denial of the payment transaction as indicated in the response code of the authorization response, and may transmit the response message to the gateway processor 608 using the standards and protocols set forth by the gateway processor 608. In step 648, the gateway processor 608 may forward the response message to the merchant 606 using the appropriate standards and protocols. In step 650, assuming the transaction was approved, the merchant 606 may then provide the products purchased by the consumer 604 as part of the payment transaction to the consumer 604.

In some embodiments, once the process 600 has completed, payment from the issuing financial institution 602 to the acquiring financial institution 610 may be performed. In some instances, the payment may be made immediately or within one business day. In other instances, the payment may be made after a period of time, and in response to the submission of a clearing request from the acquiring financial institution 610 to the issuing financial institution 602 via the transaction processing server 612. In such instances, clearing requests for multiple payment transactions may be aggregated into a single clearing request, which may be used by the transaction processing server 612 to identify overall payments to be made by whom and to whom for settlement of payment transactions.

In some instances, the system may also be configured to perform the processing of payment transactions in instances where communication paths may be unavailable. For example, if the issuing financial institution is unavailable to perform authorization of the transaction account (e.g., in step 640), the transaction processing server 612 may be configured to perform authorization of transactions on behalf of the issuing financial institution 602. Such actions may be referred to as "stand-in processing," where the transaction processing server "stands in" as the issuing financial institution 602. In such instances, the transaction processing server 612 may utilize rules set forth by the issuing financial institution 602 to determine approval or denial of the payment transaction, and may modify the transaction message accordingly prior to forwarding to the acquiring financial institution 610 in step 644. The transaction processing server 612 may retain data associated with transactions for which the transaction processing server 612 stands in, and may transmit the retained data to the issuing financial institution 602 once communication is reestablished. The issuing financial institution 602 may then process transaction accounts accordingly to accommodate for the time of lost communication.

In another example, if the transaction processing server 612 is unavailable for submission of the authorization request by the acquiring financial institution 610, then the transaction processor at the acquiring financial institution 610 may be configured to perform the processing of the transaction processing server 612 and the issuing financial institution 602. The transaction processor may include rules and data suitable for use in making a determination of approval or denial of the payment transaction based on the data included therein. For instance, the issuing financial institution 602 and/or transaction processing server 612 may set limits on transaction type, transaction amount, etc. that may be stored in the transaction processor and used to determine approval or denial of a payment transaction based thereon. In such instances, the acquiring financial institution 610 may receive an authorization response for the payment transaction even if the transaction processing server 612 is unavailable, ensuring that transactions are processed and no downtime is experienced even in instances where communication is unavailable. In such cases, the transaction processor may store transaction details for the payment transactions, which may be transmitted to the transaction processing server 612 (e.g., and from there to the associated issuing financial institutions 602) once communication is reestablished.

In some embodiments, transaction processors may be configured to include a plurality of different communication channels, which may utilize multiple communication cards and/or devices, to communicate with the transaction processing server 612 for the sending and receiving of transaction messages. For example, a transaction processor may be comprised of multiple computing devices, each having multiple communication ports that are connected to the transaction processing server 612. In such embodiments, the transaction processor may cycle through the communication channels when transmitting transaction messages to the transaction processing server 612, to alleviate network congestion and ensure faster, smoother communications. Furthermore, in instances where a communication channel may be interrupted or otherwise unavailable, alternative communication channels may thereby be available, to further increase the uptime of the network.

In some embodiments, transaction processors may be configured to communicate directly with other transaction processors. For example, a transaction processor at an acquiring financial institution 610 may identify that an authorization request involves an issuing financial institution 602 (e.g., via the bank identification number included in the transaction message) for which no value-added services are required. The transaction processor at the acquiring financial institution 610 may then transmit the authorization request directly to the transaction processor at the issuing financial institution 602 (e.g., without the authorization request passing through the transaction processing server 612), where the issuing financial institution 602 may process the transaction accordingly.

The methods discussed above for the processing of payment transactions that utilize multiple methods of communication using multiple communication channels, and includes fail safes to provide for the processing of payment transactions at multiple points in the process and at multiple locations in the system, as well as redundancies to ensure that communications arrive at their destination successfully even in instances of interruptions, may provide for a robust system that ensures that payment transactions are always processed successfully with minimal error and interruption. This advanced network and its infrastructure and topology may be commonly referred to as "payment rails," where transaction data may be submitted to the payment rails from merchants at millions of different points of sale, to be routed through the infrastructure to the appropriate transaction processing servers 612 for processing. The payment rails may be such that a general purpose computing device may be unable to properly format or submit communications to the rails, without specialized programming and/or configuration. Through the specialized purposing of a computing device, the computing device may be configured to submit transaction data to the appropriate entity (e.g., a gateway processor 608, acquiring financial institution 610, etc.) for processing using this advanced network, and to quickly and efficiently receive a response regarding the ability for a consumer 604 to fund the payment transaction.

Computer System Architecture

Figure 7:
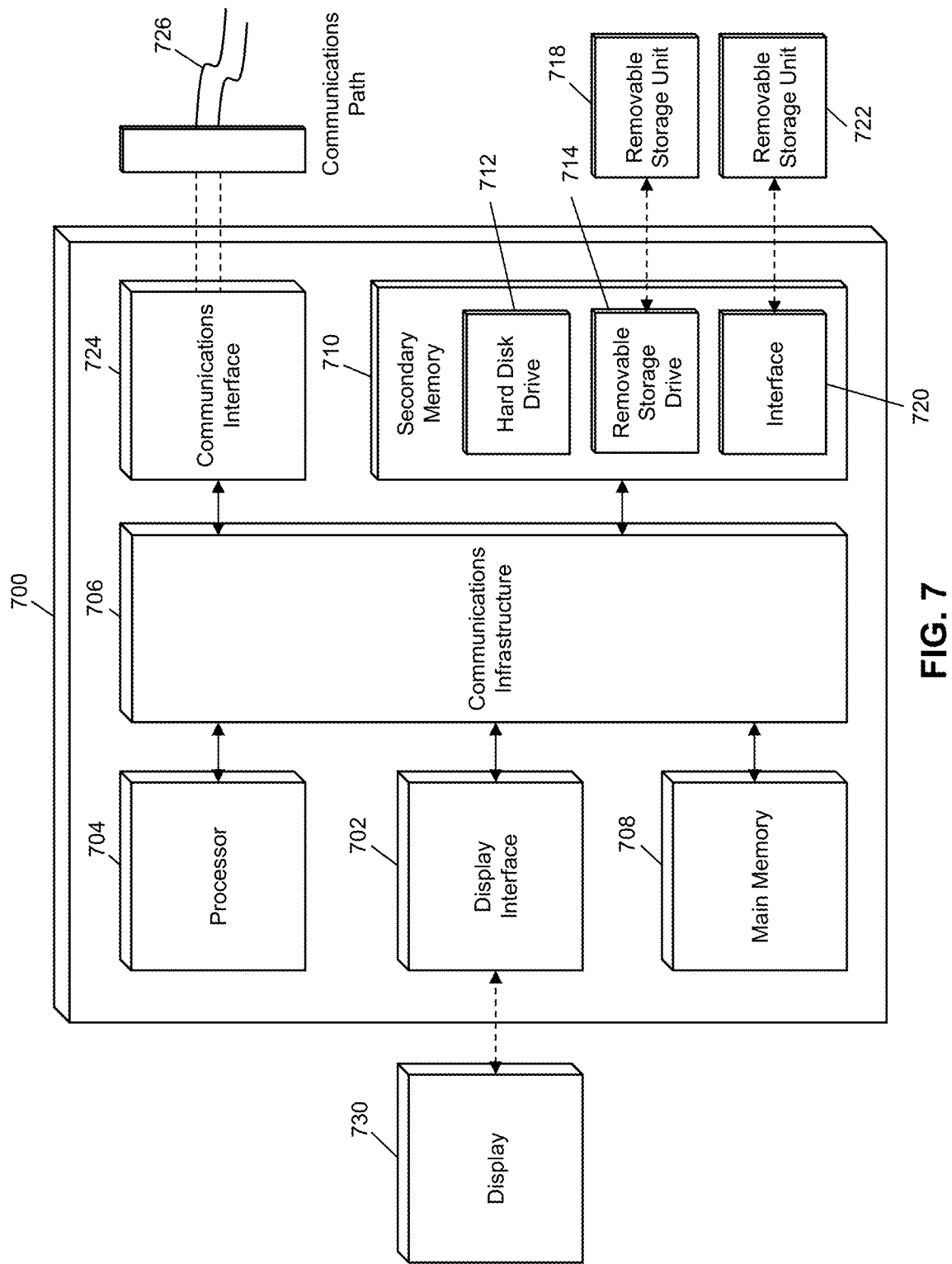
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the mobile computing device 102 of FIG. 1 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 5, and 6.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device specifically configured to perform the functions discussed herein. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, 5, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

The processor device 704 may comprise one or more modules or engines configured to perform the functions of the computer system 700. Each of the modules or engines may be implemented using hardware and, in some instances, may also utilize software, such as corresponding to program code and/or programs stored in the main memory 708 or secondary memory 710. In such instances, program code may be compiled by the processor device 704 (e.g., by a compiling module or engine) prior to execution by the hardware of the computer system 700. For example, the program code may be source code written in a programming language that is translated into a lower level language, such as assembly language or machine code, for execution by the processor device 704 and/or any additional hardware components of the computer system 700. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 700 to perform the functions disclosed herein. It will be apparent to persons having skill in the relevant art that such processes result in the computer system 700 being a specially configured computer system 700 uniquely programmed to perform the functions discussed above.

Techniques consistent with the present disclosure provide, among other features, systems and methods for initiating a time- and geographic-based electronic transaction. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for initiating a time- and geographic-based electronic transaction, comprising:
   storing, in a memory of a mobile computing device of a consumer, payment details, wherein the payment details comprise a structured data set including data associated with a transaction account suitable for use in funding an electronic transaction;
   detecting, by the mobile computing device, entry of the mobile computing device into a payment zone, wherein said payment zone is a geofenced area defined by a geographic area;
   upon detection of entry of the mobile computing device into the payment zone, transmitting, by a transmitting device of the mobile computing device, an entry detection notification to a computing device of a merchant system;
   registering, by a timing module of the mobile computing device, a first timestamp associated with the entry of the mobile computing device into the payment zone;
   detecting, by the mobile computing device, exit of the mobile computing device from the payment zone;
   registering, by the timing module of the mobile computing device, a second timestamp associated with the exit of the mobile computing device from the payment zone;
   transmitting, by the transmitting device of the mobile computing device, a first exit notification to the computing device of the merchant system, wherein the first exit notification includes the second timestamp;
   calculating, by a calculation module of the mobile computing device, a transaction amount based on at least an elapsed amount of time between the first timestamp and the second timestamp and a payment rate; and
   electronically transmitting, by a transmitting device of the mobile computing device, to the merchant system, the calculated transaction amount and payment details stored in the memory of the mobile computing device.

2. The method of claim 1, further comprising:
   storing, in the memory of the mobile computing device, the payment rate.

3. The method of claim 1, further comprising:
   transmitting, by the transmitting device of the mobile computing device, a second exit notification, wherein the second exit notification is transmitted upon exit of the mobile computing device from a second payment zone; and
   registering, by the timing module of the mobile computing device, a third timestamp associated with the mobile computing device exiting the second payment zone,
   wherein the transaction amount is further based on a second elapsed amount of time between the second timestamp and the third timestamp and a second payment rate.

4. The method of claim 3, wherein the second payment rate is equivalent to the payment rate.

5. A system for initiating a time- and geographic-based electronic transaction, comprising:
   a transmitting device of a mobile computing device of a consumer;
   a calculation module of the mobile computing device of the consumer;

a memory, of the mobile computing device of the consumer, configured to store payment details, wherein the payment details include a structured data set including data associated with a transaction account suitable for use in funding an electronic transaction; and a processing device, of the mobile computing device, configured to detect entry of the mobile computing device into a payment zone, wherein said payment zone is a geofenced area defined by a geographic area;

wherein the transmitting device, of the mobile computing device, is further configured to transmit an entry detection notification to a computing device of a merchant system, and wherein the system further comprises:

a timing module, of the mobile computing device, configured to register a first timestamp associated with the entry of the mobile computing device into the payment zone;

wherein the processing device, of the mobile computing device, is further configured to detect exit of the mobile computing device from the payment zone, the timing module, of the mobile computing device, is further configured to register a second timestamp associated with the exit of the mobile computing device from the payment zone, the transmitting device, of the mobile computing device, is configured to electronically transmit, to the merchant system, the calculated transaction amount and payment details.

6. The system of claim 5, wherein the memory of the mobile computing device is further configured to store the payment rate.

7. The system of claim 5, wherein the transmitting device, of the mobile computing device, is further configured to transmit a second exit notification, to the merchant system, wherein the second exit notification is transmitted upon exit of the mobile computing device from a second payment zone, the timing module, of the mobile computing device, is further configured to register a third timestamp associated with the mobile computing device exiting the second payment zone, and the transaction amount is further based on a second elapsed amount of time between the second timestamp and the third timestamp and a second payment rate.

8. The system of claim 7, wherein the second payment rate is equivalent to the payment rate.

* * * * *